United States Patent [19]

Seidel

[11] Patent Number: 4,885,781
[45] Date of Patent: Dec. 5, 1989

[54] FREQUENCY-SELECTIVE SOUND TRANSDUCER

[75] Inventor: Helmut Seidel, Starnberg, Fed. Rep. of Germany

[73] Assignee: Messerschmitt-Bölkow-Blohm GmbH, Munich, Fed. Rep. of Germany

[21] Appl. No.: 234,417

[22] Filed: Aug. 19, 1988

[30] Foreign Application Priority Data

Sep. 17, 1987 [DE] Fed. Rep. of Germany ....... 3731196

[51] Int. Cl.$^4$ .................. H04R 1/28; H04R 17/00; H04R 17/10; H01L 41/08
[52] U.S. Cl. .................... 381/159; 310/324; 381/190; 381/203
[58] Field of Search ............... 381/159, 114, 116, 190, 381/191, 173, 174, 203; 310/324

[56] References Cited

U.S. PATENT DOCUMENTS

| | | | |
|---|---|---|---|
| 3,568,108 | 3/1971 | Poirier | 381/173 |
| 3,947,708 | 3/1976 | Fulenwider | 381/173 |
| 3,983,518 | 9/1976 | Bezemer | 310/322 |
| 4,075,600 | 2/1978 | Sims et al. | 310/322 |
| 4,517,486 | 5/1985 | Andrews | 310/321 |
| 4,751,419 | 6/1988 | Takahata | 310/324 |
| 4,783,821 | 11/1988 | Muller et al. | 381/190 |

FOREIGN PATENT DOCUMENTS 2167257  5/1986  United Kingdom ............... 310/322

OTHER PUBLICATIONS

IEEE Proceedings of the International Conference on Solid State Sensors and Actuators–Transducers, "A Frequency Selective, Piezoresistive Silicon Vibration Sensor", W. Beneke et al., 1985, pp. 105–108.

Primary Examiner—Jin F. Ng
Assistant Examiner—Danita R. Byrd
Attorney, Agent, or Firm—Kenyon & Kenyon

[57] ABSTRACT

A frequency-selective sound transducer comprised of a number of resonators with differing but sequential natural frequencies arranged in a first plane. A deformable membrane is arranged in a second plane, parallel to the first plane and in close proximity thereto. A small air gap thus exists between the first and second planes. Sound waves produce vibratory motion in the membrane, which motion is transmitted to the resonators by pressure waves generated by the membrane in the air between the membrane and resonators. The deflections of the resonators are converted into electrical signals.

10 Claims, 1 Drawing Sheet

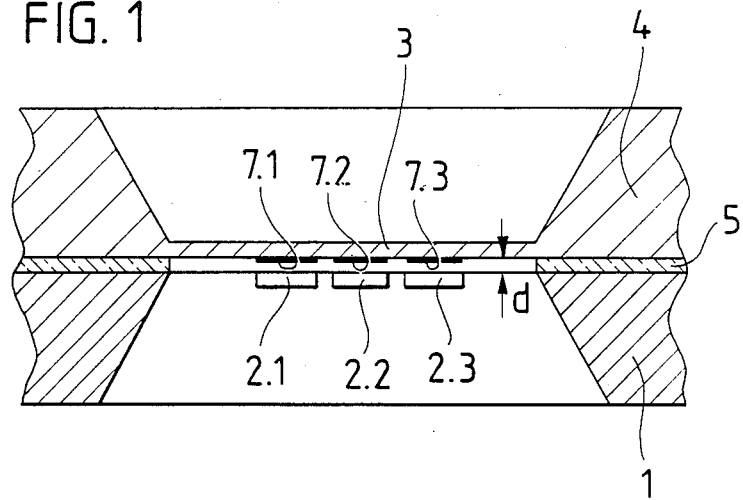
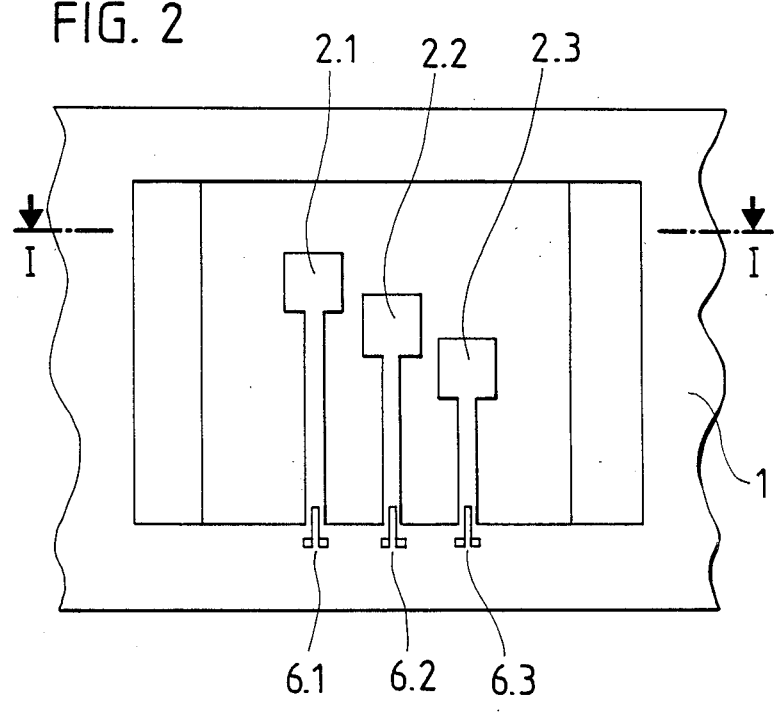

FREQUENCY-SELECTIVE SOUND TRANSDUCER

BACKGROUND OF THE INVENTION

The present invention is a frequency-selective sound transducer comprising a plurality of mechanical resonators arranged in a plane. The resonators are set into vibratory motion when struck by sound waves having the natural (harmonic) frequency of the respective resonators. The vibratory motion is converted into electrical signals.

DESCRIPTION OF THE PRIOR ART

A frequency-selective sound transducer for converting auditory signals into electrical signals is described in an article entitled "A Frequency-Selective, Piezo-Resistive Silicon Vibration Sensor" written by W. Benecke et al. and published in "Proceedings of the International Conference on Solid-State Sensors and Actuators-Transducers 1985", Boston, MA, June 11–12, 1985. The transducer consists of a comb-like arrangement of bars capable of bending when sound waves impinge upon them, the bars being etched from a silicon substrate. The bars have different natural frequencies and are so designed that bars with different but sequential natural frequencies neighbor one another. The bars are coupled to one another by means of a frame. The frame also serves to transmit sound waves impacting the transducer's body into the bars. The vibration of the bars is transformed into an electrical signal by means of a piezo-resistive element located at the foot of each bar. A transducer of this type allows direct frequency-selective reception of sound transmitted through a solid body. However, this transducer is unable to transform sound waves received through the air directly into electrical signals.

OBJECT AND SUMMARY OF THE INVENTION

It is an object of this invention to provide a sound transducer which can transform sound waves received from the air into electrical signals directly.

A further object of this invention is to provide a transducer which can transform sound waves received from the air into electrical signals directly, which can be fabricated from a silicon substrate and which will be as small in size as possible.

These objects and others are realized by a sound transducer having a number of resonators arranged in a first plane wherein a membrane capable of vibration is fixed in a parallel, second plane in close proximity to the first plane so that an air gap is formed between the resonators and the membrane. Sound waves produce vibrations in the membrane, which in turn produces vibrations in the air between the membrane and the resonators, the air finally causing the resonators to vibrate.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by reference to the following description taken in conjunction with the drawings in which:

FIG. 1 is a cross-section of the present invention; and
FIG. 2 is a top plan view of the present invention.

DETAILED DESCRIPTION OF THE PREFERRED EMBODIMENT

Referring to the drawings, the desired number of resonators, here three and numbered 2.1, 2.2, and 2.3, are etched from substrate 1 using known micro-circuit fabrication techniques. The resonators here take the form of bending bars. The natural (harmonic) frequency of each resonator is different from but sequential to that of its neighboring resonators. All the resonators are collocated in a first plane.

Deformable membrane 3 is located in a second plane, parallel to the first plane and in close proximity thereto. Membrane 3 is clamped in frame 4. The distance between membrane 3 and resonators 2.1, 2.2, and 2.3 is on the order of a few micrometers and is determined by the thickness of spacer layer 5 which can be applied to either frame 4 or substrate 1.

Sound waves stimulate membrane 3 into vibration in a known manner. Membrane 3 in turn sets the air in the gap between membrane 3 and resonators 2.1, 2.2, and 2.3 into vibration, the vibrating air in turn causing the resonators to vibrate when the vibrating air has the same frequency as the natural frequencies of the resonators. The amplitude of the vibrations in the resonators can be converted into an electrical signal by piezo-resistor, piezo-electric, or capacitance principles.

If piezo-resistor or -electric principles are used, a piezo-electric and/or -resistor element must be applied to each resonator. These are illustrated as elements 6.1, 6.2, and 6.3 in FIG. 2. If capacitance principles are used, each resonator has a metal film applied to one side to form an electrode and counter-electrodes, illustrated in FIG. 1 as elements 7 1, 7.2, and 7.3, are applied to membrane 3 as metal films. The elements 7.1, 7.2 and 7.3 may have the same surface area as the resonators 2.1, 2.2 and 2.3.

Both substrate 1 and frame 4 consist of single-crystal silicon from which the resonators and the membrane are etched out monolithically. Spacer 5 can be a thin glass layer. Coupling the frame and substrate together can occur by means of anodic bonding.

By using a deformable membrane in conjunction with resonators 2.1, 2.2, and 2.3, sound waves may be converted into electrical signals in a frequency-selective manner without the necessity of expensive electrical filtering, as is required in a conventional microphone. The number of resonators determines the range of sound frequencies detected and/or the resolution of the sound into individual frequency ranges. By using a large number of resonators, a wide-band sound transducer having high sensitivity over its entire frequency range can be obtained.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A frequency-selective sound transducer comprising:

a plurality of resonators arranged in a first plane, the resonators vibrating when influenced by sound waves having the same frequency as the natural frequency of the resonators, the vibrating motion of the resonators being converted into electrical signals; and membrane means arranged in a second plane, the second plane being parallel to the first plane and in close proximity thereto, a small air gap being formed thereby between the membrane and resonators, the membrane being capable of vibratory motion when struck by sound waves, the vibratory motion of the membrane causing vibratory motion in the air in the air gap and, in turn, vibratory motion in the resonators.

2. The transducer of claim 1 wherein the resonators are in the form of bending bars, each resonator having a different natural frequency, and all the resonators being fixed at one end.

3. The transducer of claim 2 wherein electrical conducting surfaces are arranged on the side of the resonators facing the membrane and on the surface of the membrane facing the resonators, said electrical conducting surfaces on the membrane being located opposite to the electrical conducting surfaces on the resonators, the electrical conducting surfaces allowing movement of the resonators to be converted into electrical signals using known capacitance principles.

4. The transducer of claim 2 wherein piezo-resistor elements are arranged on the resonators for converting the vibratory motion of the resonators into electrical signals using known piezo-resistor principles.

5. The transducer of claim 2 wherein piezo-electric elements are arranged on the resonators for converting the vibratory motion of the resonators into electrical signals using known piezo-electric principles.

6. The transducer of claim 1 wherein the resonators are produced from a monolithic silicon substrate.

7. The transducer of claim 1 wherein the membrane is produced from a monolithic silicon substrate.

8. The transducer of claim 6 wherein the membrane is produced from the same monolithic silicon substrate as the resonators.

9. The sound transducer of claim 8 wherein both the membrane and the resonators are surrounded by bending resistant frames, the frames being of equal size and having uniform inside dimensions, the frames being coupled to one another, placing the resonators and membrane in close parallel proximity to one another and forming an air gap between them.

10. The transducer of claim 3 wherein the electrical conducting surfaces on the membrane have areas equal to those of the corresponding resonators.

* * * * *